US012701646B2

(12) United States Patent
Zhu et al.

(10) Patent No.: US 12,701,646 B2
(45) Date of Patent: Aug. 4, 2026

(54) LIGHT STRIP CONTROL DEVICE

(71) Applicant: Shenzhen Oceanwing Smart Innovations Technology Co., Ltd, Shenzhen (CN)

(72) Inventors: Keqing Zhu, Shenzhen (CN); Dongjun Xiao, Shenzhen (CN); Yiyin Zhang, Shenzhen (CN); Qiushi Zhang, Shenzhen (CN); Zhun Ding, Shenzhen (CN); Jianxin Chen, Shenzhen (CN); Zhongkuai Liao, Shenzhen (CN)

(73) Assignee: Shenzhen Oceanwing Smart Innovations Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/774,188

(22) Filed: Jul. 16, 2024

(65) Prior Publication Data

US 2025/0071874 A1 Feb. 27, 2025

(30) Foreign Application Priority Data

Jul. 17, 2023 (CN) ......................... 202310885628.3

(51) Int. Cl.
*H05B 47/105* (2020.01)
*H05B 47/135* (2020.01)
(Continued)

(52) U.S. Cl.
CPC ......... *H05B 47/135* (2020.01); *H05B 47/155* (2020.01); *H05B 47/165* (2020.01); *H05B 47/1965* (2024.01)

(58) Field of Classification Search
CPC .. H05B 47/135; H05B 47/155; H05B 47/165; H05B 47/1965
See application file for complete search history.

(56) References Cited

U.S. PATENT DOCUMENTS

2011/0035404 A1* 2/2011 Morgan ............... H05B 47/155 707/769

FOREIGN PATENT DOCUMENTS

CA 3091297 A1 * 8/2019 ......... G06Q 10/0639
CN 107172783 A 9/2017
(Continued)

OTHER PUBLICATIONS

Sep. 10, 2025—(CN) First Office Action—App. No. 202310885668.3 w/Machine translation.

*Primary Examiner* — Henry Luong
(74) *Attorney, Agent, or Firm* — Banner & Witcoff, Ltd.

(57) ABSTRACT

This application relates to a method, device and storage medium for controlling a light strip. The method includes: obtaining control information and user attribute information of a target light strip having a plurality of lamp beads; determining light effect parameters of the plurality of lamp beads in the target light strip based on the control information and user attribute information; and controlling the plurality of lamp beads in the target light strip according to the determined light effect parameters. This allows the light effect parameters of each lamp bead in the light strip to be automatically determined for a particular user based on the control information and user attribute information. As a result, the embodiments in the application improve the efficiency in setting the light effect parameters to match user expectations.

20 Claims, 7 Drawing Sheets

(51) Int. Cl.

| | |
|---|---|
| ***H05B 47/155*** | (2020.01) |
| ***H05B 47/165*** | (2020.01) |
| ***H05B 47/175*** | (2020.01) |

(56) References Cited

FOREIGN PATENT DOCUMENTS

| | | | |
|---|---|---|---|
| CN | 108156734 | A | 6/2018 |
| CN | 110035578 | A | 7/2019 |
| CN | 112153788 | A | 12/2020 |
| CN | 215818699 | U | 2/2022 |
| JP | 2015097178 | A | 5/2015 |

* cited by examiner

LIGHT STRIP CONTROL DEVICE

The present application claims priority to CN application Ser. No. 202310885628.3, filed on Jul. 17, 2023. The above application is incorporated by reference in its entirety.

FIELD

This application relates to the field of smart home technology, and in particular to a method, device, electronic device and storage medium for controlling a light strip.

BACKGROUND

In recent years, with the popularity of smart home technology and the increasing demand for personalized decoration, light strings (also known as light strips) have become an important aspect of home and architectural exterior decoration, gaining more popularity among users. To meet the demand for personalized lighting effects, various lighting effects software applications (e.g., APPs) have emerged on the market.

Although these software applications come with a large number of pre-set lighting effects, due to the vast variety of lighting effects, users need to try each one individually and apply them to the actual product in order to find a lighting scheme that meets their needs. In addition, the custom editing functions are complex and difficult to use, which are not user-friendly for the average users. Users desire attractive lighting effects in the decorations, but limited by personal aesthetics and abilities, cannot customize the ideal lighting effects and have to repeatedly click and try different options.

Therefore, how to improve the efficiency for users to set up a light effect that meets their expectations is a technical issue that deserves attention.

SUMMARY

In view of the above, in order to solve some or all of the above technical problems, examples of the present application provide a light strip control method, a device, an electronic device, and a storage medium.

In a first aspect, examples of the present application provide a method of controlling a light strip, the method comprising:

obtaining control information and user attribute information of a target light strip, wherein the target light strip has a plurality of lamp beads;

determining, based on the control information and the user attribute information, one or more light effect parameters of the plurality of lamp beads included in the target light strip;

controlling the plurality of lamp beads included in the target light strip in accordance with the determined light effect parameters.

In a possible example, the method further comprises:

before the determining the light effect parameters, determining lamp bead information of the plurality of lamp beads included in the target light strip; wherein the lamp bead information includes at least one of the following: a height of a lamp bead in the plurality of lamp beads, an angle corresponding to the lamp bead, and the distance corresponding to the lamp bead; the angle corresponding to the lamp bead is: the angle between an irradiation direction of the lamp bead and a ground direction; the distance corresponding to the lamp bead is: the distance between the lamp bead and a target lamp bead; and the target lamp bead is a neighboring lamp bead in the target direction of the lamp bead;

based on the determined lamp bead information, dividing the target light strip to obtain a plurality of segments, wherein each segment includes at least one lamp bead; and the determining, based on the control information and the user attribute information, the one or more light effect parameters of the plurality of lamp beads included in the target light strip, comprising:

determining the one or more light effect parameters for one or more lamp beads included in a segment, of the plurality of segments, based on the control information and the user attribute information.

In one possible example, a height of a particular lamp bead in the segment is determined in the following manner:

determine an angle between an irradiation direction of this lamp bead and the ground direction to get the target angle for the lamp bead;

determining a distance between the lamp bead and the ground based on the target angle to obtain the height of the lamp bead; and The distance corresponding to this particular lamp bead is determined in the following manner:

based on the target angle, a distance between the lamp bead and a target lamp bead is determined.

In a possible example, the segment of the plurality of segments satisfy at least one of the following conditions:

First condition: 1) a first height difference is less than or equal to a first height threshold, wherein the first height difference is: a height difference between a lamp bead in the segment and a target lamp bead of the lamp bead; and 2) a first angle difference is less than or equal to a first angle threshold, wherein the first angle difference is: a difference between an angle corresponding to a lamp bead in the segment and an angle corresponding to a target lamp bead of the lamp bead.

Second condition: 1) the first height difference is greater than the first height threshold; 2) a second height difference is less than a second height threshold, wherein the second height difference is: a difference between a maximum height difference between any two lamp beads in the segment and a minimum height difference between any two lamp beads in the segment; and 3) the first angle difference is less than or equal to the first angle threshold.

Third condition: a boundary lamp bead in the segment satisfies a condition that a distance between the boundary lamp bead and the target lamp bead of the boundary lamp bead is greater than a first distance or less than a second distance, wherein the second distance is less than the first distance;

Fourth condition: a number of boundary lamp beads in each sub-segment of the segment is less than or equal to 2.

In a possible example, after the dividing the target light strip to the plurality of segments, the method further comprises:

determining category information for each segment of at least two segments in the plurality of segments; and the light effect parameters of the lamp beads included in the plurality of segments are further determined based on the category information.

In a possible example, the determining light effect parameters of lamp beads included in the target light strip, comprising:

determining, using at least one of a pre-trained machine learning model and a pre-established light effect knowledge base, the light effect parameters corresponding to the control information and the user attribute information to obtain light effect parameters of the lamp beads included in the target light strip;

the pre-trained machine learning model is used to characterize the correspondence between the control information, the user attribute information and the light effect parameters;

the pre-established light effect knowledge base is used to characterize the correspondence between the control information, the user attribute information and the light effect parameters of the target quantity set of the light effect parameters.

In a possible example, the employing at least one of the pre-trained machine learning model and the pre-established light effect knowledge base to determine light effect parameters corresponding to the control information and the user attribute information, comprising:

inputting the control information and the user attribute information into the pre-trained machine learning model to obtain output data from the pre-trained machine learning model;

determining whether the output data represents light effect parameters corresponding to the control information and the user attribute information to obtain discriminative information;

after determining that the discriminative information indicates that the output data is not light effect parameters corresponding to the control information and the user attribute information, the pre-established light effect knowledge base is used to determine the target quantity set of light effect parameters corresponding to the control information and the user attribute information.

In a possible example, the control information is input via a user; and the determining, based on the control information and the user attribute information, the light effect parameters of the lamp beads included in the target light strip, comprising:

determining, based on the control information and the user attribute information, a plurality sets of light effect parameters for a lamp bead included in the target light strip;

determining, from the plurality sets of the light effect parameters, the target quantity set of light effect parameters, wherein the target quantity set of the light effect parameters are sent to a control terminal of the light strip; and the controlling the plurality of lamp beads included in the target light strip in accordance with the light effect parameters, comprising:

from the light effect parameters described in the target quantity set, selecting a light effect parameter;

controlling the lamp beads included in the target light strip in accordance with the selected light effect parameter.

In a possible example, the determining the target quantity set of light effect parameters, comprising:

determining the target quantity of light effect parameters from the plurality sets of the light effect parameters based on a return priority corresponding to each set of the plurality of sets of the light effect parameters; and after determining, from the plurality sets of light effect parameters, the target quantity set of light effect parameters, lowering the return priority corresponding to the light effect parameter in the target quantity set.

In a second aspect, examples of the present application provide a light strip control device, the device comprising:

An acquisition unit for acquiring control information and user attribute information of a target light strip, wherein the target light strip comprises a plurality of lamp beads;

A first determination unit for determining one or more light effect parameters of a lamp bead included in the target light strip based on the control information and the user attribute information;

A control unit for controlling the lamp bead included in the target light strip in accordance with the one or more light effect parameters.

In a possible example, before the determining, based on the control information and the user attribute information, the light effect parameters of the lamp bead included in the target light strip, the device further comprises:

A second determination unit for determining lamp bead information of the lamp bead included in the target light strip; wherein the lamp bead information includes at least one of the following: a height of the lamp bead, an angle corresponding to the lamp bead, and a distance corresponding to the lamp bead; the angle corresponding to the lamp bead is: the angle between the irradiation direction of the lamp bead and the ground direction; the distance corresponding to the lamp bead is: the distance between the lamp bead and the target lamp bead; and the target lamp bead is a neighboring lamp bead in the target direction of the lamp bead;

A division unit for dividing the target light strip to obtain a plurality of segments based on the lamp bead information, wherein each segment includes at least one lamp bead; and the determining, based on the control information and the user attribute information, one or more light effect parameter of the lamp bead included in the target light strip, comprising:

determining one or more light effect parameters for one or more lamp beads included in each segment based on the control information and the user attribute information.

In a possible example, the height of a lamp bead in a segment, is determined in the following manner:

determine the angle between the irradiation direction of this lamp bead and the ground direction to get the target angle;

determining the distance between the lamp bead and the ground direction based on the target angle to obtain the height of the lamp bead; and the distance corresponding to this lamp bead is determined in the following manner:

based on the target angle, determining the distance between the lamp bead and the target lamp bead.

In a possible example, each segment satisfies any of the following conditions:

First condition: 1) the first height difference is less than or equal to a first height threshold, wherein the first height difference is: a height difference between a lamp bead in the segment and a target lamp bead of the lamp bead; and 2) the first angle difference is less than or equal to a first angle threshold, wherein the first angle difference is: a difference between an angle corresponding to a lamp bead in the segment and an angle corresponding to a target lamp bead of the lamp bead;

Second condition: 1) the first height difference is greater than the first height threshold; 2) a second height difference is less than a second height threshold, wherein the second height difference is: a difference between a maximum height difference between lamp beads in the segments and a minimum height difference between lamp beads in the segments; and 3) the first angle difference is less than or equal to the first angle threshold;

Third condition: a boundary light bead in the segment satisfies a condition that the distance between the boundary light bead and the target light bead of the boundary light bead is greater than a first distance or less than a second distance, wherein the second distance is less than the first distance;

Fourth condition: a number of boundary lamp beads in each sub-segment is less than or equal to 2.

In a possible example, after the dividing the target light strip to obtain the plurality of segments, the device further comprises:

A third determination unit for determining category information for segment of at least two segments; and the determining the lamp efficiency parameters of the lamp beads included in the segment is further based on the category information.

In a possible example, the determining one or more light effect parameters of one or more lamp beads included in the target light strip based on the control information and the user attribute information, comprising:

using at least one of a pre-trained machine learning model and a pre-established light effect knowledge base, to determine the light effect parameters corresponding to the control information and the user attribute information to obtain the light effect parameters of the lamp beads included in the target light strip;

the machine learning model is used to characterize the correspondence between the control information, the user attribute information and the light effect parameters;

the pre-established light effect knowledge base is used to characterize the correspondence between the control information, the user attribute information and the light effect parameters of a target quantity set of light effect parameters.

In a possible example, the employing at least one of the pre-trained machine learning model and the pre-established light effect knowledge base to determine the light effect parameters corresponding to the control information and the user attribute information, comprising:

inputting the control information and the user attribute information into the pre-trained machine learning model to obtain output data from the pre-trained machine learning model;

determining whether the output data represents light effect parameters corresponding to the control information and the user attribute information to obtain discriminative information;

In the event that the discriminative information indicates that the output data is not the light effect parameters corresponding to the control information and the user attribute information, the pre-established light effect knowledge base is used to determine the target quantity set of light effect parameters corresponding to the control information and the user attribute information.

In a possible example, the control information is input via a user; and the determining, based on the control information and the user attribute information, the light effect parameters of the lamp beads included in the target light strip, comprising:

determining, based on the control information and the user attribute information, a plurality sets of light effect parameters for a lamp bead included in the target light strip;

determining, from the plurality sets of the light effect parameters, the target quantity set of light effect parameters, wherein the target quantity set of the light effect parameters are sent to a control terminal of the light strip; and the controlling one or more lamp beads included in the target light strip in accordance with the light effect parameters, comprising:

selecting light effect parameter from the target quantity set of the light effect parameters;

controlling one or more lamp beads included in the target light strip in accordance with the selected light effect parameters selected.

In a possible example, the determining, from the plurality sets of the light effect parameters, the target quantity set of light effect parameters, comprising:

determining the target quantity set of light effect parameters from the plurality sets of the light effect parameters based on a return priority corresponding to each set of the plurality sets of light effect parameters; and after determining, from the plurality sets of light effect parameters, the target quantity set of light effect parameters, lowering the return priority corresponding to the light effect parameter in the target quantity set.

In a third aspect, examples of the present application provide an electronic device comprising:

Memory for storing computer programs;

A processor for executing a computer program stored in the memory, and the computer program, when executed, implements the method of any of the examples of the method of controlling a light strip of the first aspect of the present application described above.

In a fourth aspect, examples of the present application provide a computer-readable storage medium having a computer program stored thereon, the computer program, when executed by a processor, implementing a method such as the method of any of the examples of the method of controlling a light strip of the first aspect described above.

In a fifth aspect, examples of the present application provide a computer program, the computer program comprising computer-readable code which, when the computer-readable code is run on a device, causes a processor in the device to implement a method such as the method of any example of the method of controlling a light strip of the first aspect described above.

Examples of the present application provide a method for controlling a light strip, wherein control information and user attribute information of a target light strip can be obtained, wherein the target light strip includes a plurality of lamp beads, after which one or more light effect parameters of one or more lamp beads included in the target light strip is determined on the basis of the control information and the user attribute information, and then a lamp bead included in the target light strip is controlled in accordance with the light effect parameters. Thus, based on the control information of the light strip and the user attribute information, it is possible to automatically determine for a particular user using the one or more light effect parameters of each lamp bead included in the light strip, and control each lamp bead accordingly, thereby reducing the difficulty and improving the efficiency in setting light effect parameters that meets user expectations.

BRIEF DESCRIPTION OF THE DRAWINGS

The accompanying drawings herein are incorporated into and form a part of the specification, illustrate examples in accordance with the invention, and are used in conjunction with the specification to explain the principles of the invention.

In order to more clearly illustrate the technical solutions in the examples or prior art of the present invention, the accompanying drawings required to be used in the description of the examples or prior art will be briefly described below, and it will be obvious to a person of ordinary skill in the art that other accompanying drawings can be obtained on the basis of these drawings without creative laboriousness.

One or more examples are illustrated exemplarily by means of pictures corresponding thereto in the accompanying drawings, which exemplary illustrations do not constitute a limitation of the examples, and elements having the same reference numerical designation in the accompanying drawings are indicated to be similar elements, and the drawings in the accompanying drawings do not constitute a limitation of scale, unless specifically affirmed.

Figure 1:
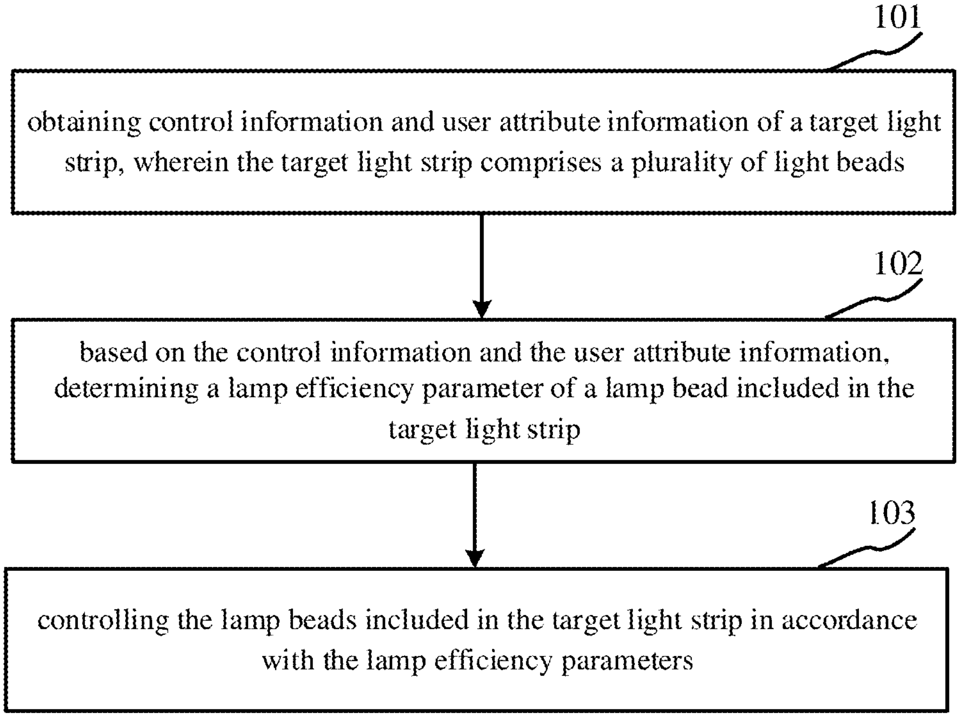
Figure 2:
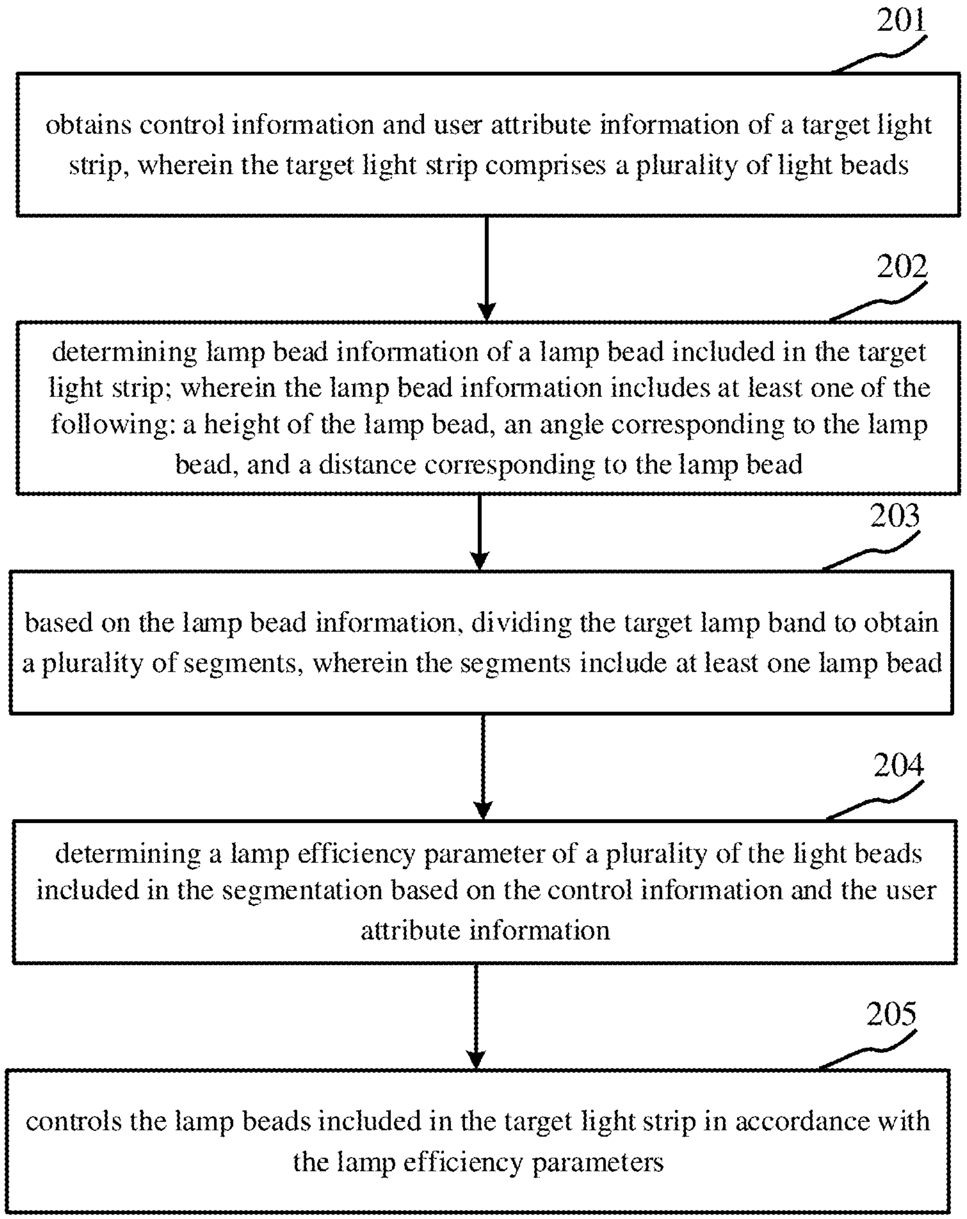
Figure 3A:
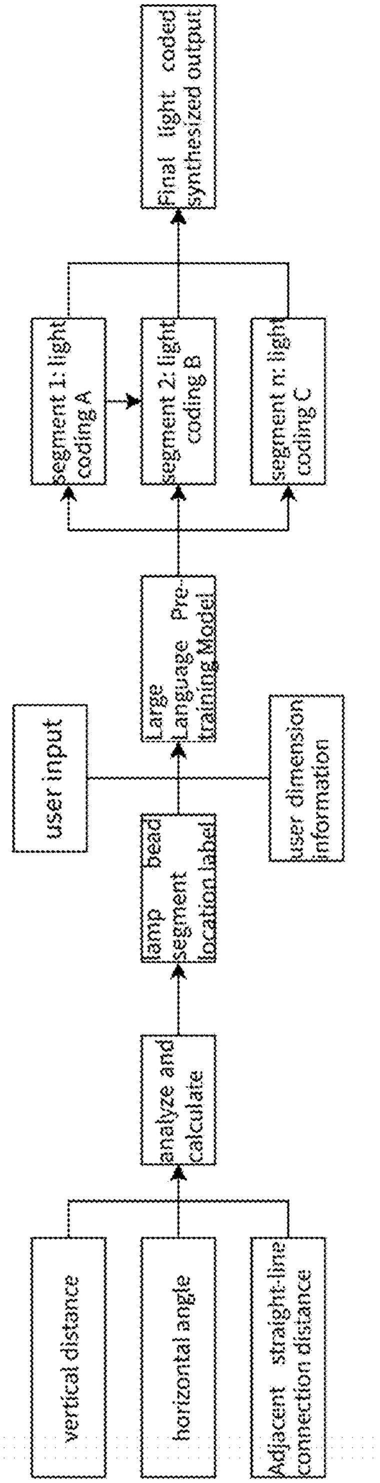
Figure 3B:
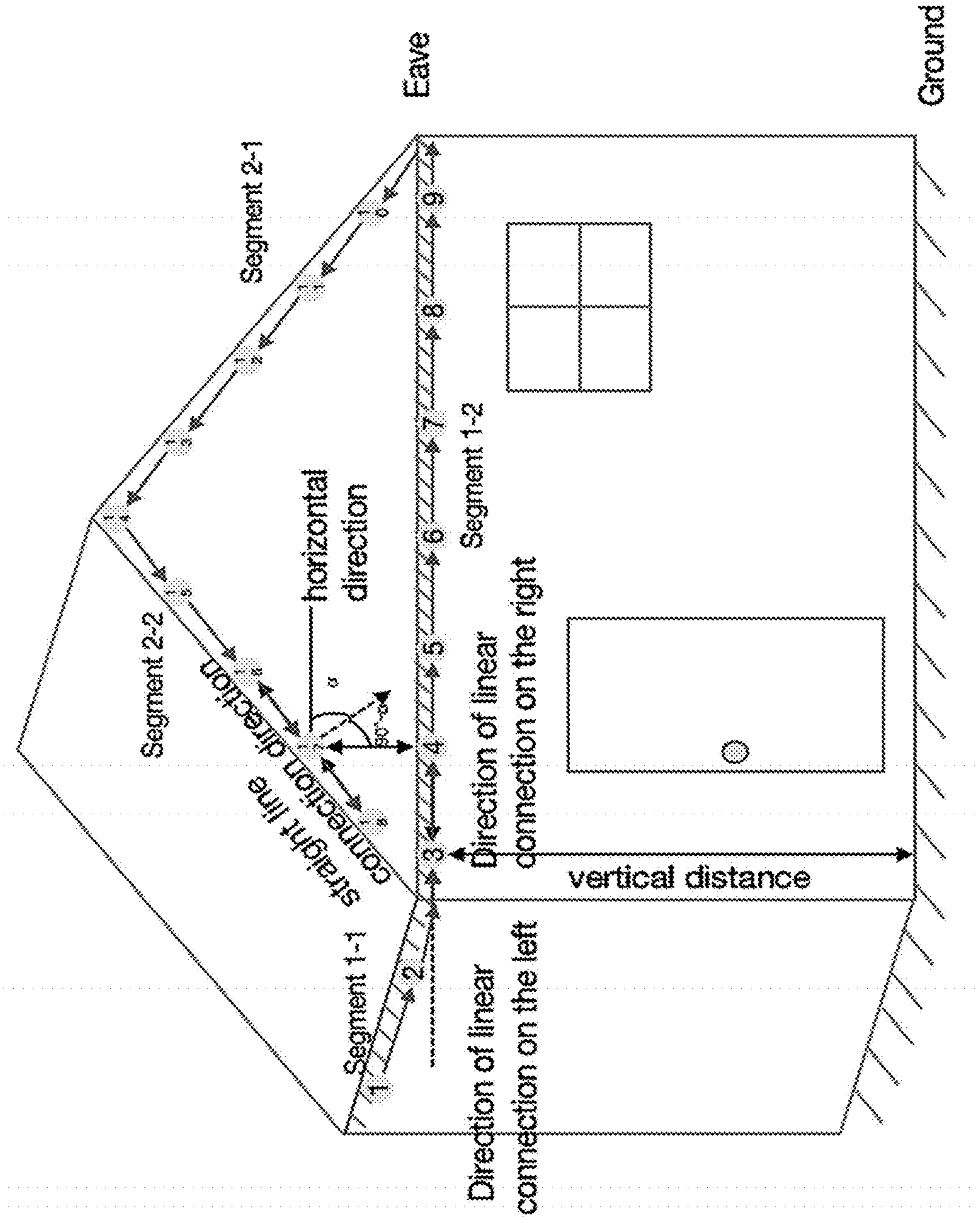
Figure 3C:
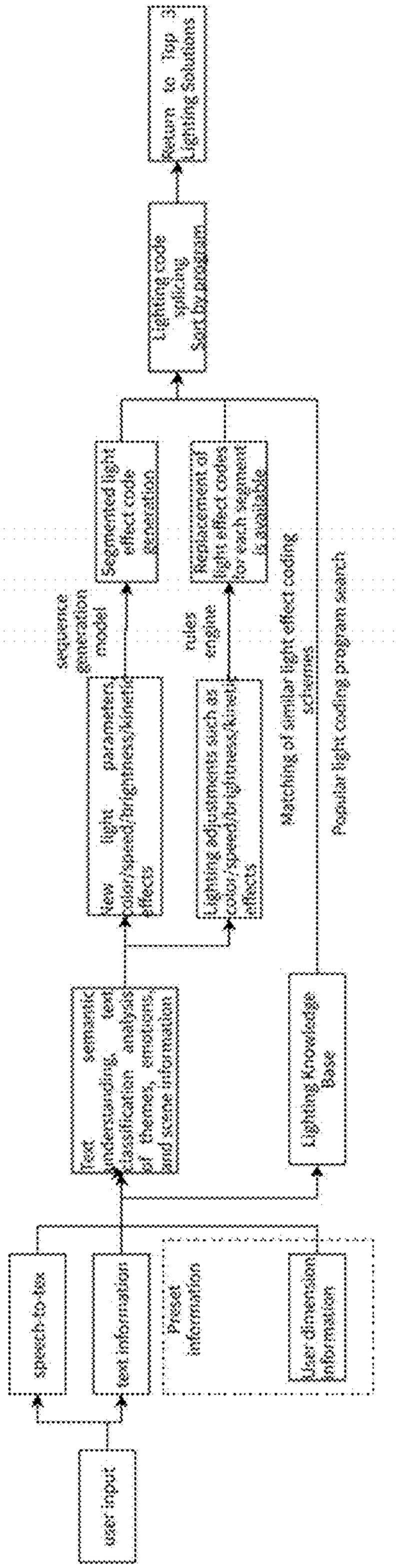
Figure 4:
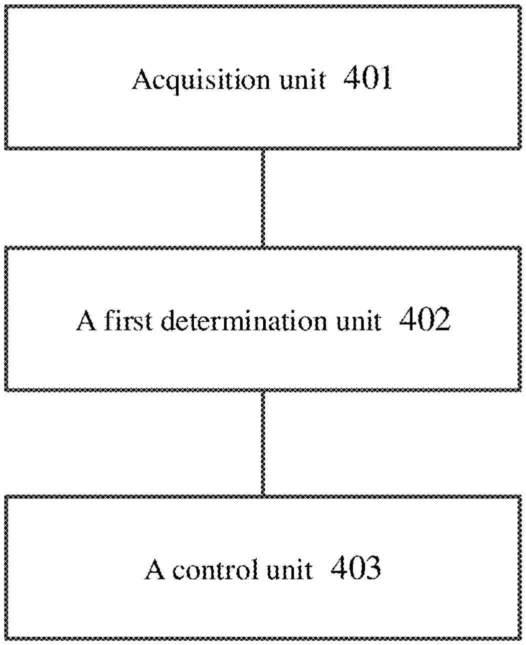
Figure 5:
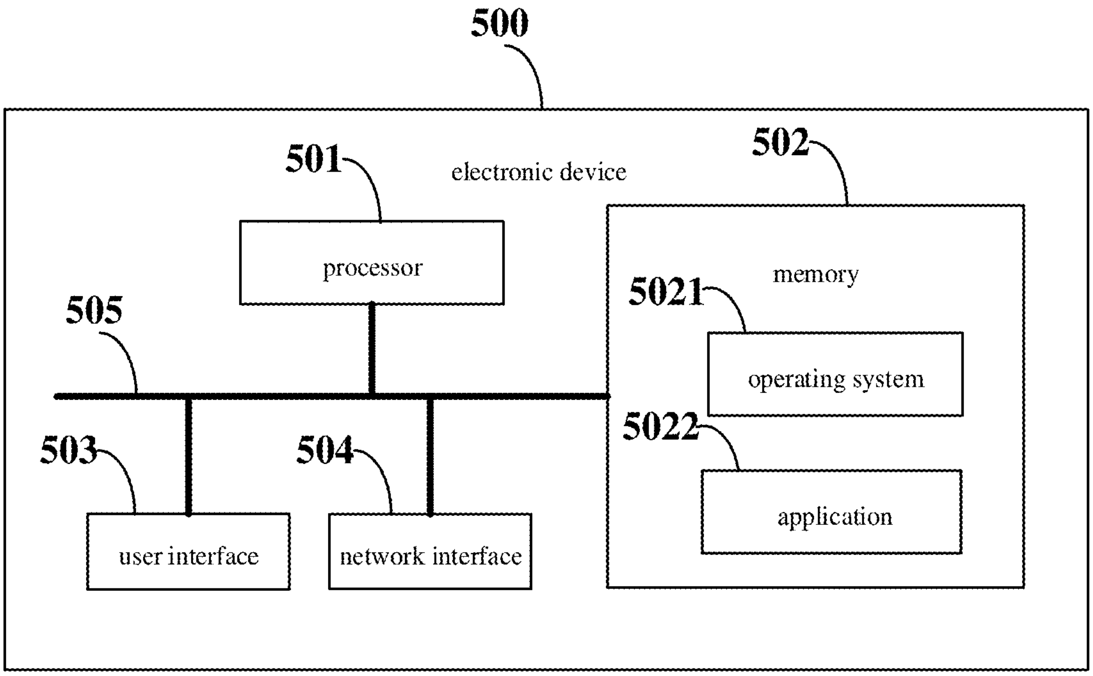

FIG. 1 shows a flow diagram of a light strip control method provided by an example of the present application;

FIG. 2 shows a flow diagram of another light strip control method provided by examples of the present application;

FIG. 3A shows a flow chart of yet another light strip control method provided by examples of the present application;

FIG. 3B shows a schematic diagram of dividing a segment;

FIG. 3C shows a flow diagram of a further light strip control method provided by an example of the present application;

FIG. 4 shows a schematic diagram of a structure of a light strip control device provided by an example of the present application;

FIG. 5 is a schematic diagram of a structure of an electronic device provided by an example of the present application.

BRIEF DESCRIPTION

Various exemplary examples of the present application will now be described in detail with reference to the accompanying drawings, and it is clear that the examples described are a part of the examples of the present application and not all of the examples. It should be noted that the relative arrangements, numerical expressions and values of the components and steps set forth in these examples do not limit the scope of the present application unless otherwise specifically stated.

It is understood by those skilled in the art that the terms "first", "second" and the like in the examples of the present application are only used to differentiate between different steps, devices, modules and other objects, and do not represent any particular technical meaning or indicate a logical order among them.

It should also be understood that, in this example, "plurality" may refer to two or more, and "at least one" may refer to one, two or more.

It should also be understood that any of the components, data, or structures referred to in examples of the present application may generally be understood to be one or more in the absence of an express limitation or contrary revelation given before or after.

In addition, the term "and/or" in the present application is merely a description of an association relationship of the associated objects, and indicates that three kinds of relationships may exist, for example, A and/or B, which may be indicated as: the existence of A alone, the existence of both A and B, and the existence of B alone. In addition, the character "/" in the present application generally indicates that the associated objects are in an "or" relationship.

It should also be understood that the description of the various examples in the present application highlights the differences between the various examples, and that their similarities or likenesses can be cross-referenced and will not be repeated for the sake of brevity.

The following description of at least one exemplary example is in fact merely illustrative and in no way serves as any limitation on the present application and its application or use.

Techniques, methods and apparatus known to those of ordinary skill in the relevant field may not be discussed in detail, but where appropriate, the techniques, methods and apparatus should be considered part of the specification.

It should be noted that similar labels and letters denote similar items in the accompanying drawings below, so that once an item is defined in an accompanying drawing, it does not need to be discussed further in subsequent accompanying drawings.

It is to be noted that the examples and the features in the examples in the present application may be combined with each other without conflict. To facilitate the understanding of the examples of the present application, the present application will be described in detail below with reference to the accompanying drawings and in conjunction with the examples. Obviously, the described examples are a part of the examples of the present application and not all of the examples. Based on the examples in this application, all other examples obtained by a person of ordinary skill in the art without making creative labor fall within the scope of protection of this application.

It is also noted that the users described in the present application (e.g., the users corresponding to the user attribute information), which may be distinguished by a user identification. For example, the user identification may be a login account, and in this scenario, if different persons adopt the same account for login, the different persons may be considered to be the same user; if the same persons adopt different accounts for login respectively, the same persons logging into different accounts may be considered to be different users. Further, for example, in a state where the device is not logged in, a user identification may also be assigned based on a device identification of the device. In this scenario, if different persons operate the device with the same device identification, the different persons may be considered to be the same user; if the same persons operate the device with different device identifications, the same persons may be considered to be different users.

In order to solve a technical problem in the prior art of how to improve the efficiency of a user in setting out light effect parameters that meet his or her expectations, the present application provides a method of controlling a light strip that can improve the efficiency of a user in setting out the light effect parameters that meet his or her expectations.

FIG. 1 shows a flow diagram of a light strip control method provided by an example of the present application. The present method may be applied to one or more electronic devices such as a smartphone, a laptop computer, a desktop computer, a portable computer, a server, and the like. In addition, the execution subject of the present method may be hardware or software. When the above-described execution subject is hardware, the execution subject may be one or more of the above-described electronic devices. For example, a single electronic device may execute the present method, or a plurality of electronic devices may cooperate with each other to execute the present method. When the above-described execution subject is software, the present method may be implemented as a plurality of software or software modules, or may be implemented as a single software or software module. No specific limitation is made herein.

As shown in FIG. 1, the method specifically comprises:

Step 101, obtaining control information and user attribute information of a target light strip, wherein the target light strip comprises a plurality of lamp beads.

The target light strip, in this example, may be any light strip. The light strip, also known as a light bar, may comprise a plurality of light beads or lamp beads. The aforementioned target light strip can be a flexible light strip, which can be bent and can be fixed to objects with decorative needs such as houses and trees. Individual lamp beads on the target light strip can be controlled according to different light effect parameters. Among them, the above light effect parameters may include, but are not limited to: color, brightness, light change speed, light change frequency.

In practice, by setting the light effect parameters of the lamp beads in the light strip (e.g. the above-mentioned target light strip), different atmospheres can be set, thus the target light strip can be made applicable to different scenes, themes, atmospheres, music, etc.

The control information described above can be used to control the target light strip. As an example, the control information may be voice or text input by the user, or may be a control command formed by the user triggering a key.

The user attribute information may be information of a user associated with the above-described target light strip. As an example, the target light strip may be controlled by a console (e.g., an APP installed on the user terminal), and the information of the user logged in to the console may be the above-described user attribute information. For example, the above-described user attribute information may be user personal information such as the country set by the user when logging in to the above-described console, such as, for example, the country, the region, the number of times and the length of time the light effect parameter has been used, and the like.

Step 102, based on the control information and the user attribute information, determining a light effect parameter of a lamp bead included in the target light strip.

In this example, a variety of ways may be used to perform the above step 102.

As an example, a pre-trained machine learning model may be employed to determine a light effect parameter of a lamp bead included in the target light strip based on the control information and the user attribute information. The machine learning model may represent a correspondence between the control information, the user attribute information and the light effect parameters.

As a further example, a pre-established knowledge base may also be employed to determine a light effect parameter of a lamp bead included in the target light strip based on the control information and the user attribute information. The knowledge base may represent a correspondence between the control information, the user attribute information and the light effect parameter.

Specifically, each lamp bead included in the target light strip may correspond to a unique code. As a result, a light effect parameter of the lamp bead can be determined by determining the light effect parameter corresponding to each code.

In addition, it is possible to determine, based on the control information and the user attribute information, the light effect parameters of each lamp bead included in the target light strip one by one, or it is possible to determine, based on the control information and the user attribute information, the light effect parameters of all lamp beads included in the target light strip as a whole, or it is possible to determine, based on the control information and the user attribute information, the light effect parameters of the lamp beads included respectively in each sub-section of the target light strip. lamp beads in each of the segments of the target light strip, based on the control information and the user attribute information.

Step 103, controlling the lamp beads included in the target light strip in accordance with the light effect parameters.

In this example, after determining the light effectparameter of each lamp bead, the corresponding lamp bead can be controlled in accordance with the determined light effect parameter.

In some optional implementations of the present example, may be used to determine a light effect parameter of a lamp bead included in the target light strip based on the control information and the user attribute information as follows: at least one of a pre-trained machine learning model and a pre-established light effect knowledge base is used to determine a light effect parameter corresponding to the control information and the user attribute information to obtain a light effect parameter of a lamp bead included in the target light strip. lamp efficiency parameters of the lamp beads included.

The machine learning model is used to characterize the correspondence between the control information, the user attribute information and the light effect parameters.

As examples, the above machine learning models may include: large language models, Long Short-Term Memory (LSTM) networks, and the like.

A big language model is a language model that contains hundreds of billions (or more) of parameters that are trained on a large amount of text data. Here, the big language model can be used to generate the light effect parameters of each segment of the lamp bead based on the positional segmentation information and user inputs for text comprehension and semantic analysis of the target light strip as a whole or different segments of the lamp bead, and ultimately to achieve the effect of displaying different light effect parameters of the lamp beads in different positions.

Long Short-Term Memory Network, a powerful recurrent neural network structure, can overcome the gradient problem of traditional RNN (Recurrent Neural Networks) by introducing the mechanism of gates, making it perform well in processing long sequences and natural language processing tasks. Here, an LSTM model can be used in advance to model and train the preprocessed light effect coding sequence and various data of light effect parameters, and then according to the trained model, input the generated light effect parameters of each segment, such as color, speed, brightness, and kinetic effect, to generate the light effect coding sequence corresponding to the series of parameters.

The light effect knowledge base is used to characterize the correspondence between the control information, the user attribute information and the target number of group light effect parameters. Here, the light effect knowledge base may contain an input from the user (e.g., the control information described above), the light effect preferred by the user under that input (e.g., the target number of sets of light effect parameters described above), and personal dimension information of the user (e.g., the user attribute information described above), such as information about the country, the region, the number of times the light effect parameters was used and the duration of using the light effect parameters, and the like.

It is to be understood that in the above optional example, at least one of the pre-trained machine learning model and the pre-established knowledge base of the light effect parameters may be used to determine the light effect parameters of the lamp beads included in the target light strip, which may make the determined the light effect parameters more in line with the user's expectation.

In some application scenarios of the above optional implementations, may be used to determine a light effect parameter corresponding to the control information and the user attribute information using at least one of a pre-trained machine learning model and a pre-built knowledge base of light effect parameters, as follows:

Step 1, inputting the control information and the user attribute information into a pre-trained machine learning model to obtain output data of the machine learning model.

Step 2, determining whether the output data represents a light effect parameter corresponding to the control information and the user attribute information, obtaining discriminative information.

Step 3, in the event that the discriminatory information indicates that the output data is not a light effect parameter corresponding to the control information and the user attribute information, a pre-established light effect knowledge base is used to determine a target quantity set of light effect parameters corresponding to the control information and the user attribute information.

The discriminative information indicates that the output data is not a light effect parameter corresponding to the control information and the user attribute information, and may indicate that the large language model does not recognize that the user intent cannot return a valid light effect solution.

It can be understood that, in the above application scenario, if the large language model does not identify the user's intent and cannot return an effective light effect scheme, the light effect knowledge base can be used to return similar light effects or popular light effects for the user as a supplement, such as returning popular light effects, e.g., the light effect parameters that have been used for a certain period of time and ranked among the top three in the list of the number of times used. Thus, the machine learning model and the light effect knowledge base can be combined to determine the light effect parameters, so that the determined light effect parameters are more in line with the user's expectations.

In some optional implementations of this example, the described control information is entered via a user. For example, the control information may be text and/or voice input by the user.

On this basis, the following approach may be used to determine a light effect parameter of a lamp bead included in the target light strip based on the control information and the user attribute information:

A first step is to determine a plurality of light effect parameters for a lamp bead included in the target light strip based on the control information and the user attribute information.

As an example, at least one of a pre-trained machine learning model and a pre-established light effect knowledge base may be employed to determine a plurality of sets of light effect parameters for one or more lamp beads included in the target light strip based on the control information and the user attribute information.

In a second step, from the plurality sets of the light effect parameters, a target quantity set of light effect parameters are determined.

The target quantity set may be a predetermined and fixed value, or may be a predetermined proportion of the determined number of light effect parameters.

The target quantity set of the light effect parameters are sent to the control terminal (e.g., mobile phone APP) of the light strip. That is, after the execution of the second step, the target quantity set of light effect parameters may be returned to the console for display by the console.

On this basis, the following can be used to control the lamp beads included in the target light strip in accordance with the light effect parameters:

Step 1, determining a selected light effect parameter from the light effect parameter described in the target number group.

Here, after the console displays a target quantity set of the light effect parameters, the user can select one or more light effect parameters therefrom to obtain the selected light effect parameters.

Step 2, controlling the lamp beads included in the target light strip in accordance with the selected light effect parameters.

Here, after determining the selected light effect parameter, the corresponding lamp bead can be controlled in accordance with the selected the light effect parameters.

It is to be understood that in the above optional implementation, a plurality of sets of light effect parameters may be recommended to the user for selection therefrom, whereby the determined light effect parameters may be made to be more in line with the user's expectations.

In some application scenarios in the above optional implementation method, may determine a target quantity set of light effect parameters from a plurality sets of light effect parameters in the following manner: based on a return priority corresponding to each set of the plurality sets of light effect parameters, the target quantity of light effect parameters are determined from the plurality sets of light effect parameters.

For example, the quantity set of light effect parameters may be determined from the plurality of the groups of light effect parameters in order of return priority from highest to lowest.

On this basis, after determining a target quantity set of light effect parameters from a plurality of the groups of light effect parameters, it is also possible to lower the return priority corresponding to the target quantity set of the light effect parameters.

It can be understood that, in the above application scenario, after determining the light effect parameter that needs to be returned to the control terminal, the frequency of the subsequent return of the light effect parameter to the control terminal can be reduced by lowering the return priority of the corresponding light effect parameter, e.g., when the user enters the same content (e.g., the control information described above) multiple times, and the results returned by the model or the knowledge base are close to each other, then a certain rule can be made for processing in the sorting, and the sorting can be done to ensure that different light effect solutions are returned when the user enters the same content multiple times. When returning, the priority of the light effect scheme that has been returned before is lowered, and the light effect scheme that has not been returned before is given priority to return, which can ensure that different light effect schemes are returned when the user inputs the same content several times, and the diversity of light effects is maintained.

Examples of the present application provide a method for controlling a light strip, wherein control information and user attribute information of a target light strip can be obtained, wherein the target light strip includes a plurality of lamp beads, after which a light effect parameter of a lamp bead included in the target light strip is determined on the basis of the control information and the user attribute information, and then a lamp bead included in the target light strip is controlled in accordance with the light effect parameter. Thus, based on the control information of the light strip and the user attribute information, it is possible to automatically determine for the user the light effect parameter of each lamp bead included in the light strip, and control each lamp bead accordingly, thereby reducing the difficulty of the user in setting a light effect that meets his or her expectation, and thereby improving the efficiency of the user in setting a light effect that meets his or her expectation.

FIG. 2 shows a flow diagram of another light strip control method provided by examples of the present application. As shown in FIG. 2, the method specifically comprises:

Step 201, obtains control information and user attribute information of a target light strip, wherein the target light strip comprises a plurality of lamp beads.

In this example, step 201 is substantially the same as step 101 in the corresponding example of FIG. 1, and will not be repeated here.

Step 202, determining lamp bead information of a lamp bead included in the target light strip; wherein the lamp bead information includes at least one of the following: a height of the lamp bead, an angle corresponding to the lamp bead, and a distance corresponding to the lamp bead.

In this example, the height of this lamp bead, may indicate the distance between this lamp bead and the ground. The angle corresponding to this lamp bead is: the angle between the irradiation direction of this lamp bead (e.g. the center light of the lamp bead) and the ground direction. The distance of the lamp bead is the distance between the lamp bead and the target lamp bead. The target lamp bead is the neighboring lamp bead in the target direction of this lamp bead. The target direction can indicate the direction of the straight-line connection between the lamp beads.

The target lamp bead may comprise: a lamp bead adjacent to the left of the lamp bead and/or a lamp bead adjacent to the right of the lamp bead in the target direction.

Here, the default ground is the horizontal plane, and the distance detection module of the base of each lamp bead can be used to obtain the angle $\alpha$ (e.g., the angle corresponding to the lamp bead mentioned above) of the initial ranging sensor in the direction of the irradiation plane of the lamp and the horizontal plane by means of a level; then the ranging sensor is adjusted to the vertical ground direction by the angle of $(90°-\alpha)$, and the distance from the base of the lamp bead to the vertical ground direction from the shelter is measured, so as to obtain the height of the lamp bead. At the same time, the distance detection module detects the distance between the left and right sides of the lamp bead in the direction of the connecting straight line (e.g., the target direction mentioned above), so as to obtain the corresponding distance of the lamp bead.

In some optional realizations of this example, the height of the lamp bead, is determined in the following manner:

Firstly, the angle between the direction of illumination of this lamp bead and the ground is determined to get the target angle.

wherein the target angle, may indicate the angle between the irradiation direction of the lamp bead and the ground direction.

Afterwards, based on the target angle, the distance between the lamp bead and the ground is determined to obtain the height of the lamp bead.

Here, the distance between the lamp bead and the ground can be obtained by means of a distance measuring sensor. The ranging sensor, for example, may be provided on the base of the lamp bead, whereby the distance between the lamp bead and the ground may be obtained by means of the distance between the lamp bead and an obstacle (e.g. the ground) obtained by the ranging sensor. If the angle corresponding to the lamp bead is a right angle, then the distance measuring sensor can directly obtain the distance between the lamp bead and the ground. If the angle corresponding to the light bulb is not a right angle, then the distance between the light bulb and the ground can be calculated using the Pythagorean theorem based on the distance obtained by the distance measuring sensor.

On this basis, the distance corresponding to this lamp bead is determined in the following manner: based on the target clamp angle, the distance between this lamp bead and the target lamp bead is determined, and the distance corresponding to this lamp bead is obtained.

In addition, it should be noted that in the process of determining the height of the lamp bead, and the distance corresponding to the lamp bead, the target angle can be adjusted to a right angle without actually adjusting the target angle to a right angle.

It can be understood that in the above optional realization, by determining the height of the lamp bead and the distance corresponding to the lamp bead based on the target angle of entrapment, lamp bead information such as the height of the lamp bead and the distance corresponding to the lamp bead can be obtained more accurately, so that, by the subsequent steps, the segmentation of the light strip can be carried out more accurately.

Step 203, based on the lamp bead information, dividing the target lamp band to obtain a plurality of segments, wherein each segment include at least one lamp bead.

In this example, the individual lamp beads included in each segment, may be approximately located in a straight line.

In some optional realizations of this example, each segment satisfies at least one of the following conditions:

Condition one, the first height difference is less than or equal to the first height threshold, and, the first angle difference is less than or equal to the first angle threshold.

The first height difference is: a difference in height between a lamp bead in the segment and a target lamp bead (e.g. a left neighboring lamp bead and a right neighboring lamp bead in the target direction) of the lamp bead. the first angular difference is: a difference between an angle corresponding to a lamp bead in the segment and an angle corresponding to a target lamp bead of the lamp bead.

Here, when the vertical height distance of a plurality of adjacent lamp beads from an obscuring object (e.g., the ground) is within 100 mm (e.g., the above-described first height difference) from the adjacent lamp beads and the horizontal angle difference (e.g., the above-described first angle difference) from the adjacent lamp beads is within 10° (e.g., the above-described first angle threshold), the lamp beads can be considered to be at the same horizontal level, and in turn By analogy, lamp beads with the same information and in close proximity to each other can be divided into segments.

Condition two, the first height difference is greater than the first height threshold, the second height difference is less than the second height threshold, and, the first angle difference is less than or equal to the first angle threshold.

wherein the second height difference is: a difference between a maximum height difference between lamp beads in the segments and a minimum height difference between lamp beads in the segments.

Here, when the vertical height distance of a plurality of adjacent lamp beads from a shelter (e.g., the ground) is greater than 100 mm (e.g., the above-described first height difference) with respect to the height of the neighboring lamp beads (e.g., the above-described first height threshold), but the difference between a maximum and a minimum value of the difference (e.g., the above-described second height difference) is less than 100 mm (e.g., the above-described second height threshold), and the horizontal angle difference with respect to the neighboring lamp beads (e.g., above first angle difference) is within 10° (e.g., above first angle threshold), these lamp beads can be considered to be in the same section.

Condition three, the segmented boundary lamp bead satisfies the following condition: the distance between the boundary lamp bead and the target lamp bead of the boundary lamp bead is greater than a first distance or less than a second distance. The second distance is less than the first distance.

Here, the value of the distance between the lamp bead and the neighboring lamp beads in the right and left linear directions (e.g., the target direction mentioned above) is judged to determine whether the lamp bead is a segment boundary point, and when the lamp bead's distance from the lamp bead connected linearly to the left or the right is greater than 550 mm (e.g., the first distance mentioned above) or less than 250 mm (e.g., the second distance mentioned above), it is considered to be a segment boundary point (e.g., the boundary lamp bead).

Condition four, the segment comprises a number of boundary lamp beads in a single sub-segment less than or equal to 2.

It will be appreciated that in the above optional realization, the use of conditions such as those described above allows for more accurate segmentation or division of the target light strip into segments, thereby enabling segmented control of the target light strip.

Step 204, determining a light effect parameter of a plurality of the lamp beads included in the segment based on the control information and the user attribute information.

In this example, a variety of ways may be used to perform the above step 204.

As an example, a pre-trained machine learning model may be employed to determine a light effect parameter of a lamp bead included in a plurality of the segments based on the control information and the user attribute information. Wherein the machine learning model, may represent a correspondence between the control information, the user attribute information, and the light effect parameter of the lamp beads included in the plurality of the segments.

As a further example, a pre-established knowledge base may also be employed to determine a light effect parameter of a lamp bead included in a plurality of the segments based on the control information and the user attribute information. Wherein the knowledge base, may represent a correspondence between the control information, the user attribute information, and the light effect parameter of the lamp bead included in the plurality of the segments.

Specifically, each lamp bead included in the target light strip may correspond to a unique code. As a result, a light effect parameter of the lamp bead can be determined by determining the light effect parameter corresponding to each code.

Step 205, controls the lamp beads included in the target light strip in accordance with the light effect parameters.

In this example, step 205 is substantially the same as step 103 in the corresponding example of FIG. 1, and will not be repeated here.

In some optional implementations of this example, after the dividing the target light strip to obtain a plurality of segments based on the lamp bead information, it is further possible to determine the category information of each the segment of at least two the segments.

The category information, among other things, may include one of the following: the front side of an eave, the side of an eave, the slope side of a house, and the like. For example, if the heights of the lamp beads in the segment and the angles corresponding to the lamp beads are within the error range, then the corresponding categorized information may indicate the front and side of the eaves. If the height of the lamp bead in the segment is increasing or decreasing, then the corresponding classification information can indicate the slope side of the house.

On this basis, the following can be used to perform the above determination of a light effect parameter of a plurality of the lamp beads included in the segments based on the control information and the user attribute information:

determining, based on the control information, the user attribute information, and the category information, a light effect parameter for a plurality of lamp beads included in the segment.

As an example, a pre-trained machine learning model may be used to determine a light effect parameter of a light bulb included in a plurality of the segments based on the control information, the user attribute information, and the category information. Wherein the machine learning model, may represent a correspondence between the control information, the user attribute information, the category information, and the light effect parameter of the lamp beads included in the plurality of the segments.

As a further example, a pre-established knowledge base may also be used to determine a light effect parameter of a lamp bead included in a plurality of the segments based on the control information, the user attribute information, and the category information. The knowledge base, may represent a correspondence between the control information, the user attribute information, the category information, and the light effect parameter of a plurality of the lamp beads included in the segments.

It is to be noted that, in addition to the above-documented contents, the present example may also include the corresponding technical features described in the example corresponding to FIG. 1, and thereby realize the technical effect of the light strip control method shown in FIG. 1, please refer to the relevant description of FIG. 1 for a concise description, which will not be repeated herein.

Examples of the present application provide a method for controlling a light strip, which enables a more refined control of the light strip by performing light strip segmentation, thereby making the target light strip more suitable for different scenes, themes, atmospheres, music, and the like.

The following is an exemplary description of the examples of the present application, but it should be noted that the examples of the present application may have the features described below, but the following description does not constitute a limitation of the scope of protection of the examples of the present application.

In recent years, with the popularity of smart home and the increase of users' demand for personalized decorations, light strings (also known as the above mentioned target light strips) are becoming more and more popular among users as an important part of home and architectural exterior decoration. In order to meet the user's demand for personalized lighting effects, a wide range of lighting effects software APPs have appeared on the market; however, although these software have a large number of pre-set lighting effects, due to the wide variety of lighting effects, the user needs to try them out one by one and apply them to the actual product in order to find a lighting solution that meets his or her needs. In addition, the custom editing function is also relatively complex and difficult to use, which is not friendly to ordinary users.

The current industry solution is mainly through the preset light effect scheme to add classification function, but the actual use of the user still need to try and practical application of the scheme under the classification theme one by one. Custom editing requires the user to set up each item.

As a result, users want to look good to decorate the atmosphere but are limited by their personal aesthetics and ability to customize the ideal lighting effects, requiring repeated clicks and attempts.

This method can be used to generate segmented light effect parameters and full-segment light effects using large language models and light string position information, which is applicable to light control technology in various smart home scenes, and can be applied to intelligent light strings, light strips and other kinds of lighting devices in the eaves of houses.

In this context, large language models, are language models that contain hundreds of billions (or more) of parameters that are trained on large amounts of textual data.

LSTM: Long Short-Term Memory (LSTM) is a powerful recurrent neural network structure that overcomes the gradient problem of traditional RNNs by introducing the mechanism of gates, allowing it to excel in processing long sequences and natural language processing tasks.

3D model: three dimension model, which mainly refers to three-dimensional house model.

The methodology consists of the following two parts:

1. Segmented Light Effect Parameter Generation

Through the distance measuring module, the distance from the base of each lamp bead on the light string (e.g., the above mentioned target light strip) to the vertical ground direction obstruction (e.g. the ground) (e.g., the height of the above mentioned lamp beads), the angle to the horizontal plane (e.g., the angle corresponding to the lamp beads), and the distance between the lamp beads in the straight line connecting direction (e.g., the distance corresponding to the above mentioned lamp beads) are obtained, and are sent to the back-end server. The backend server calculates and analyses the segmentation information of the lamp beads in different positions based on the vertical distance and the distance interval in the linear connection direction. Using the large language model, the text understanding and semantic analysis of the different segments of the lamp beads based on the positional segmentation information and user input (e.g., the above control information) generates the light effect parameters of the lamp beads in each segment, and ultimately achieves the effect of displaying different light effect based on different light effect parameters for the lamp beads in different positions.

2. A full Section of the Light Effect Parameter Generation

This part is a supplement to the first part of the content. In the case of obtaining the position of the lamp beads on the string of light segment information cannot be obtained, the mechanism can be directly based on the user's text or voice input (e.g., the above control information), and the use of large language model for text comprehension and semantic analysis of the input content, to generate a full section of the string of lights corresponding to the light effect parameter, so as to give the user for the recommendation of the segmentation of the situation is no longer taken into account. Specifically, the method comprises:

I. Segmented Light Effect Parameter Generation

As an example, please refer to FIG. 3A, which shows a flow diagram of yet another light strip control method provided by examples of the present application.

Step 1: Obtain the angle between the lamp bead and the horizontal plane (e.g., the angle corresponding to the lamp bead), the distance from the occlusion in the vertical direction (e.g., the height of the lamp bead), and the distance between the lamp beads in the direction of the straight-line connection (e.g., the distance corresponding to the lamp bead).

Here, the precondition for the above information to be obtained is that the ground is horizontal by default. The distance detection module of the base of each lamp bead obtains the angle $\alpha$ (e.g., the angle corresponding to the above-mentioned lamp bead) of the initial range sensor in the direction of the irradiation surface of the lamp and the horizontal surface through a level meter, and reports the angle $\alpha$ data to the background server; then the range sensor is adjusted to the vertical ground direction at an angle of $(90°-\alpha)$, and the distance from the base of the lamp bead to the vertical ground direction to the shade is measured (e.g., the height of the above-mentioned lamp bead), and reports the current height and angle of the lamp bead; at the same time, the distance detection module detects the distance between the left and right of the lamp bead in the connected straight line direction (e.g., the height of the above-mentioned lamp bead), and reports the current height and angle of the lamp bead. (e.g., the height of the lamp bead), and report the current height and angle of the lamp bead; at the same time, the distance detection module detects whether the distance between the left and right sides of the lamp bead in the connecting straight line direction (e.g., the corresponding distance of the lamp bead) conforms to the specified value, and reports the distance value of the neighboring lamp beads in the same straight line connecting direction. As an example, reference is made to FIG. 3B, which shows a schematic diagram of a way of dividing segments. FIG. 3B illustrates an installation connection direction of the lamp beads.

Step 2: The background server analyses and calculates, based on the height, angle and distance information of each lamp bead reported by the light string (e.g., the lamp bead information), and outputs the lamp bead segmentation information, e.g., based on the lamp bead information, divides the target light strip and obtains a plurality of segments.

After the vertical height, horizontal angle and distance between adjacent lamp beads in the linear connection direction of each lamp bead obtained in step 1, the lamp beads are segmented in accordance with the coding order of the lamp beads, and the length and first and last lamp bead numbers of each segment are output, and the spacing distance between the original lamp beads and the lamp beads on the device of the product is 500 mm.

When a plurality of adjacent lamp beads are within 100 mm (e.g., the first height difference described above) of a vertical height distance from an obscuring object (e.g., the ground) from the neighboring lamp beads and the horizontal angle difference (e.g., the first angle difference described above) from the neighboring lamp beads is within 10° (e.g., the first angle threshold described above), the lamp beads may be considered to be at the same horizontal level, and so on, and so forth. Lamp beads with the same information and in close proximity to each other can be divided into segments, such as segment 1 as a whole in the segmentation results in the table below.

When the vertical height distance of a plurality of adjacent lamp beads from an obscuring object (e.g., the ground) is greater than 100 mm (e.g., the above-described first height difference) with respect to the height of the adjacent lamp beads (e.g., the above-described first height threshold), but the difference between the maximum and the minimum value of the difference (e.g., the above-described second height difference) is less than 100 mm (e.g., the above-described second height threshold), and the horizontal angle difference with respect to the adjacent lamp beads (e.g., the above-described first angle difference) is within 10° (e.g., the first angle threshold above), it can be assumed that these lamp beads are in the same segment, as shown in the table below for segment 2 as a whole in the segmentation results.

According to the lamp bead of the left and right linear direction (e.g., the above target direction) and the distance between the adjacent lamp beads on the numerical value to determine whether the lamp bead for the segment boundary point, when the lamp bead from the left or right side of the lamp bead straight line connecting the distance is greater than 550 mm (e.g., the first distance above) or less than 250 mm (e.g., the second distance above), can be considered as a boundary point of the lamp bead for the sub-section (e.g., boundary lamp bead), according to this logic will be According to this logic, beads 1~3, 9, 10, 14 and 18 are classified as boundary points of segments;

In accordance with the principle of subdivided segments, whereby each subdivided subsegment has a cut-off point less than or equal to two, subsegment 1 is subdivided into subsegments 1-1 and 1-2, where subsegment 1-1 contains two boundary points and subsegment 1-2 contains two boundary points and five intermediate points, and subsegment 2 is subdivided into subsections 2-1 and 2-2, where subsegment 2-1 contains two boundary points and three intermediate points and subsegment 2-2 contains one boundary point and three intermediate points.

Supplementary note: The above division is a more detailed one, after the detailed division, the subsequent generation of light effects, you can also use the information of the first segment to generate.

| lamp bead number | Vertical Distance to Shade | Maximum height difference from | Angle with horizontal | Distance in a straight line to the right/mm | Distance in a straight line to the left/mm | marking of points | Thresholds for grouping height differences/mm | First segment results | Second segment results |
|---|---|---|---|---|---|---|---|---|---|
| 1 | 5010 | 10 | 90 | 500 | 99999 | boundary point | 200 | segment 1 | segment 1-1 |
| 2 | 5020 | 10 | 90 | 99999 | 500 | boundary point | 200 | segment 1 | segment 1-1 |
| 3 | 5010 | 10 | 89 | 520 | 99999 | boundary point | 200 | segment 1 | segment 1-2 |
| 4 | 5000 | 10 | 91 | 510 | 500 | intermediate point | 200 | segment 1 | segment 1-2 |
| 5 | 4990 | 10 | 90 | 500 | 490 | intermediate point | 200 | segment 1 | segment 1-2 |
| 6 | 5010 | 20 | 90 | 490 | 500 | intermediate point | 200 | segment 1 | segment 1-2 |
| 7 | 5020 | 10 | 92 | 500 | 500 | intermediate point | 200 | segment 1 | segment 1-2 |
| 8 | 5010 | 10 | 90 | 490 | 500 | intermediate point | 200 | segment 1 | segment 1-2 |
| 9 | 4990 | 20 | 90 | 99999 | 490 | boundary point | 200 | segment 1 | segment 1-2 |
| 10 | 5390 | 400 | 42 | 500 | 200 | boundary point | 200 | segment 2 | segment 2-1 |
| 11 | 5800 | 410 | 45 | 490 | 500 | intermediate point | 200 | segment 2 | segment 2-1 |

Step 3: For each segment of the lamp bead output in Step 2, while using the pre-trained classification model based on the distance angle information to hit the location labels (e.g., the category information mentioned above), for example, Segment 1-1 and Segment 1-2 can be labelled as the front and side of the eaves of the house because the vertical distance and angle are within the error range, and Segment 2-1 and Segment 2-2 can be labelled as the slopes of the house because of the incremental decrement of the vertical distance of the lamp bead Segment 2-1 and Segment 2-2 can be labelled as the slope of the house because of the increasing and decreasing vertical distance of the beads.

Step 4: According to the segment length and the position label information corresponding to the segments from Steps 2 and 3, as well as the content information input by the user (e.g., the control information described above) and the user's own dimensional information (e.g., the user attribute information described above), use the large language model to generate a different light effect parameter and a light effect coding sequence for each segment, respectively, and splice the segment light effect coding sequences in order, and perform a Sort and return.

Step 4.1: The input text information of the overall module contains three parts: user input, segment length and location label, and user's own dimension; user input supports voice input and text input; when the user selects voice input, the voice acquisition module collects the user's voice; the voice recognition module preprocesses the user's voice input and converts it into text based on the acoustic model and the language model information; the segment length and location label data are derived from the output of steps 2 and 3; the user's own dimension information refers to the user's personal information such as the country set by the user when logging in to the client software, and the subsequent steps will use this information to recommend for the user a light effect that is more in line with the user's personalization.

Step 4.2: For step 4. input text message content, use a pre-trained large language model to identify user intent and return a corresponding light effect scheme for the user, as described in detail in other subsequent steps of step 4.2. In this step, if the large language model does not recognize the user intent and cannot return a valid light effect scheme, it can use the scheme in the supplementary description to return similar light effects or popular light effects for the user as a supplement, as described in detail in the supplementary description section;

Step 4.2.1: For the text information content obtained in Step 4.1, use a pre-trained large-scale natural language processing model for semantic recognition and text classification. First of all, determine the user's goal, whether it is necessary to generate new light effect parameters or adjust them based on the existing light effect, analyze and extract key information in the text message such as theme, emotion, scene, country and other important information. For example, when the user inputs Chinese New Year, the result of its semantic analysis and understanding is that the user needs the light effect parameters, and the key information extraction is: the theme is Chinese New Year, the emotion may be joyful, the scene is a traditional Chinese festival, and the country is China.

Step 4.2.2: If the user is required to generate new light effect parameters, then according to the extracted key information and the preset database of color psychology and emotional types corresponding to light kinetic effects, through the cosine similarity and other similarity matching algorithms, to generate the colors, speeds, brightness, and light effect parameters of multiple scenarios of the light effect, such as in the example mentioned in Step 4.2.1, the parameters of the generated segments in the example in which the color of segment 1 is golden The color of segment 1 in the example mentioned in step 4.2.1 is gold, yellow and red, the speed is medium, the luminance is 80%, and the kinetic type is lantern light effect, and the color of segment 2 is gold, yellow and red, the speed is medium, the luminance is 80%, and the kinetic type is running water light effect; the pre-processed coding sequence of the light effect and the various data of the light effect parameters are used for modeling training beforehand using the LSTM model, and then, based on the trained model, the parameters of the light effects of various segments are inputted. Then according to the trained model, input the parameters of each segment of the generated light effect, such as color, speed, brightness and animation, to generate the corresponding light effect coding sequence of the series of parameters.

Step 4.2.3: If the user needs to adjust the existing light effect, extract the light effect parameter items and segment names in the text to be adjusted, confirm the light effect parameters that need to be adjusted, such as color, animation type, speed and brightness; use the light effect coding rules engine to replace the color, speed and brightness of the coding sequence of the existing light effect in each segment, and get the coding sequence of the light effect after replacement.

Wherein, the color similarity, which can be obtained by calculating based on the weighted Euclidean distance method. Lighting similarity, which can be pre-set. For brightness control, the brightness can be adjusted by a preset percentage (e.g. –0%) each time. For speed control, the light switching duration can be increased or decreased by a preset duration (e.g. 5 seconds) each time.

Step 4.2 Supplementary note: When the generated light effect code sequence has accumulated a large amount of input and output content through the above steps as well as presetting the light effect in advance, it can be used to build a light effect knowledge base, which contains the user's inputs, the user's favorite light effect parameters under the input, the user's personal dimension information such as the country, the region, and the number of times and the length of time that the light effect parameters has been used, and other information. Subsequently, for the user's input information, text similarity matching can be performed in the light effect knowledge base at the same time to recall the top (e.g., the target number mentioned above) K similar light effect coding sequences in the corresponding light effect knowledge base that are similar to the input information; if the model is unable to return a valid light effect scheme, it will directly return the top three (e.g., the target number mentioned above) light effects that are popular, e.g., those that have been used for a certain period of time, from the light effect knowledge base.

Step 4.3: Splicing the segmented light effect codes returned by the model and the rule scheme in order, and then scoring the spliced light effect scheme and the light effect scheme returned by the knowledge base in accordance with the user survey in advance and the user's recent preference characteristics, similarity with the input content, and other dimensions, and carry out a comprehensive sorting to return the top three light effect schemes and the corresponding light effect code sequence; when the user repeatedly enters the same content, and the model returns similar results, then certain rules can be done when sorting the return should be prioritized to return the previously returned light effect scheme should be reduced. When the user enters the same content several times, and the model returns similar results, then certain rules can be done in the sorting process, when sorting the return, the priority of the previously returned light effect scheme should be lowered, and priority should be given to returning the light effect scheme that has not been returned before, to ensure that the user enters the same content several times, different light effect schemes are returned, and to maintain the diversity of the light effect.

II. Full-Segment Light Effect Parameter Generation

The full-segment light effect parameter generation, which is a complementary solution to the first part of the segmented light effect generation, in the case of not obtaining the positional segmentation information of the lamp beads on the light string, it is possible to generate the light effect parameters corresponding to the full-segmented light string directly based on the user's textual or voice input and the user's dimensional information, and to generate the light effect parameters corresponding to the full-segmented light string by using the big language model to perform textual comprehension and semantic analysis of the input, so as to give recommendations to the user, and the recommendation is no longer made under this circumstance. The segment position is no longer considered in this scenario.

The process of generating a light effect parameter using a large language model based on user input and user dimension information is substantially the same as the first part, with the difference that the input of the model has less segment position information, the output of the model is changed to a coded sequence of light effect parameters for the whole segment, and the rest of the part remains unchanged. As an example, please refer to FIG. 3C, which is a schematic diagram of a flow of a further light strip control method provided by an example of the present application.

It is to be noted that, in addition to the above-documented contents, the present example may also include the technical features described in the above examples, and thereby achieve the technical effects of the above-displayed light strip control method, please refer to the above description for a succinct description, which will not be repeated herein.

The light strip control method provided by examples of the present application provides an intelligent, easy-to-use light generation scheme, which can quickly and efficiently generate a variety of ambient light effect parameters that fit the needs based on the user's needs and lamp bead position segmentation, without having to repeatedly try in a large number of preset light effect parameters or set up operations in a complicated custom page. Intelligent segmentation of lamp beads in different positions, based on user input and user dimensional information through a large language model to determine the key light effect parameters, generating segmented and full-segmented lighting effects scheme.

FIG. 4 shows a schematic diagram of the structure of a light strip control device provided by an example of the present application. Specifically included:

Acquisition unit 401 for acquiring control information and user attribute information of a target light strip, wherein the target light strip comprises a plurality of lamp beads;

A first determination unit 402 for determining a light effect parameter of a lamp bead included in the target light strip based on the control information and the user attribute information;

A control unit 403 for controlling the lamp beads included in the target light strip in accordance with the light effect parameters.

In a possible example, before the determining, based on the control information and the user attribute information, a light effect parameter of a lamp bead included in the target light strip, the device further comprises:

A second determination unit (not shown in the figure) for determining lamp bead information of a lamp bead included in the target light strip; wherein the lamp bead information comprises at least one of the following: a height of the lamp bead, an angle corresponding to the lamp bead, and a distance corresponding to the lamp bead; the angle corresponding to the lamp bead is: an angle between an irradiation direction of the lamp bead and the ground; the distance corresponding to the lamp bead is: a distance between the lamp bead and the target lamp bead; The target lamp bead is the neighboring lamp bead in the target direction of this lamp bead;

A division unit (not shown in the figure) for dividing the target light strip to obtain a plurality of segments based on the lamp bead information, wherein the segments comprise at least one lamp bead; and the determining, based on the control information and the user attribute information, a light effect parameter of a lamp bead included in the target light strip, comprising:

determining a light effect parameter for a plurality of the lamp beads included in the segment based on the control information and the user attribute information.

In a possible example, the height of the lamp bead, is determined in the following manner:

determine the angle between the direction of illumination of this lamp bead and the ground to get the target angle;

determining the distance between the lamp bead and the ground based on the target angle to obtain the height of the lamp bead; and The distance corresponding to this lamp bead is determined in the following manner:

based on the target angle, the distance between the lamp bead and the target lamp bead is determined to obtain the distance corresponding to the lamp bead.

In a possible example, the segment satisfies any of the following conditions:

the first height difference is less than or equal to a first height threshold, wherein the first height difference is: a height difference between a lamp bead in the segment and a target lamp bead of the lamp bead; and, the first angle difference is less than or equal to a first angle threshold, wherein the first angle difference is: a difference between an angle corresponding to a lamp bead in the segment and an angle corresponding to a target lamp bead of the lamp bead;

the first height difference is greater than the first height threshold; the second height difference is less than a second height threshold, wherein the second height difference is: a difference between a maximum height difference between lamp beads in the segments and a minimum height difference between lamp beads in the segments; and, the first angle difference is less than or equal to the first angle threshold;

the segmented boundary lamp bead satisfies the condition that the distance between the boundary lamp bead and the target lamp bead of the boundary lamp bead is greater than a first distance or less than a second distance, wherein the second distance is less than the first distance; or the segments comprise a number of boundary lamp beads in a single sub-segment less than or equal to 2.

In a possible example, after the dividing the target light strip, based on the lamp bead information, to obtain a plurality of segments, the device further comprises:

A third determination unit (not shown in the figure) for determining the category information of each the segment of at least two the segments; and the determining a light effect parameter of a plurality of lamp beads included in the segment based on the control information and the user attribute information, comprising:

determining, based on the control information, the user attribute information, and the category information, a light effect parameter for a plurality of lamp beads included in the segment.

In a possible example, the determining a light effect parameter of a lamp bead included in the target light strip based on the control information and the user attribute information, comprising:

using at least one of a pre-trained machine learning model and a pre-established light effect knowledge base, determining light effect parameters corresponding to the control information and the user attribute information, obtaining light effect parameters of a lamp bead included in the target light strip;

wherein the machine learning model is used to characterize the correspondence between the control information, the user attribute information and the light effect parameters;

the light effect knowledge base is used to characterize the correspondence between the control information, the user attribute information and the light effect parameters of the target number group.

In a possible example, the employing at least one of a pre-trained machine learning model and a pre-established knowledge base of light effect parameters to determine a light effect parameter corresponding to the control information and the user attribute information, comprising:

inputting the control information and the user attribute information into a pre-trained machine learning model to obtain output data from the machine learning model;

determining whether the output data represents a light effect parameter corresponding to the control information and the user attribute information to obtain discriminative information;

In the event that the discriminatory information indicates that the output data is not a light effect parameter corresponding to the control information and the user attribute information, a pre-established light effect knowledge base is used to determine a target quantity set of light effect parameters corresponding to the control information and the user attribute information.

In a possible example, the control information is input via a user; and the determining, based on the control information and the user attribute information, a light effect parameter of a lamp bead included in the target light strip, comprising:

determining, based on the control information and the user attribute information, a plurality sets light effect parameters for a lamp bead included in the target light strip;

determining, from a plurality sets of the light efficiency parameters, a target quantity set of light efficiency parameters, wherein the target quantity set of the light efficiency parameters are used to return or send to a control terminal of the light strip; and the controlling a lamp bead included in the target light strip in accordance with the light effect parameters, comprising:

From the light effect parameters described in the target number group, a selected light effect parameter is determined;

controlling the lamp beads included in the target light strip in accordance with the selected light effect parameters.

In a possible example, the determining, from a plurality of sets of the light effect parameters, a target number of sets of light effect parameters, comprising:

determining a target quantity set of light effect parameters from the plurality sets of the light effect parameters based on the return priority corresponding to each set of the plurality sets of the light effect parameters; and after determining, from a plurality of the sets of light effect parameters, a target quantity set of light effect parameters, lowering the return priority corresponding to the light effect parameter of the target quantity set.

The light strip control device provided in this example may be a light strip control device as shown in FIG. 4, which may perform all the steps of each of the above-described light strip control methods, and thereby realize the technical effects of each of the above-described light strip control methods, please refer to the above relevant descriptions, which are described herein for the sake of conciseness and will not be repeated herein.

FIG. 5 is a schematic diagram of a structure of an electronic device provided by an example of the present application. The electronic device 500 shown in FIG. 5 comprises: at least one processor 501, a memory 502, at least one network interface 504, and other user interfaces 503. Various components in the electronic device 500 are coupled together via a bus system 505. It will be appreciated that the bus system 505 is used to enable connected communication between these components. The bus system 505 includes a power bus, a control bus, and a status signal bus in addition to a data bus. However, for clarity of description, the various buses are labelled as bus system 505 in FIG. 5.

Among other things, the user interface 503 may include a display, a keyboard, or a clicking device (e.g., a mouse, a trackball, a touch-sensitive pad, or a touch screen, etc.).

It will be appreciated that the memory 502 in examples of the present application may be volatile memory or non-volatile memory, or may include both volatile and non-volatile memory. Among other things, the non-volatile memory may be Read-Only Memory (ROM), Programmable Read-Only Memory (PROM), Erasable Programmable Read-Only Memory (EPROM), Electrically Erasable Programmable Read-Only Memory (EEPROM), or Electrically Erasable Programmable Read-Only Memory (EEPROM). EPROM, EEPROM), or flash memory. The volatile memory may be Random Access Memory (RAM), which is used as an external cache. By way of exemplary, but not limiting, illustration, many forms of RAM are available, such as Static Random Access Memory (SRAM), Dynamic Random Access Memory (DRAM), Synchronous DRAM (SDRAM), Double Data Rate Synchronous Dynamic Random Access DRAM, Synchronous DRAM (SDRAM), Double Data Rate SDRAM (DDRSDRAM), Enhanced Synchronous Dynamic Random Access Memory (ESDRAM), Synchronous Link DRAM (SLDRAM), and Direct Rambus Random Access Memory (DRRAM). Rambus RAM (DRRAM). The memory 502 described herein is intended to include, but is not limited to, these and any other suitable types of memory.

In some implementations, the memory 502 stores elements, executable units or data structures, or a subset of them, or an extended set of them, as follows: an operating system 5021 and an application 5022.

Wherein the operating system 5021, contains various system programs, such as a framework layer, a core library layer, a driver layer, and the like, for implementing various basic businesses as well as handling hardware-based tasks. The application 5022, containing various applications, such as a media player (Media Player), a browser (Browser), and the like, is used to implement various application businesses. Programs for implementing the methods of the examples of the present application may be included in the application 5022.

In this example, the processor 501 is used to perform the method steps provided by each method example by calling a program or instruction stored in the memory 502, specifically, a program or instruction stored in the application 5022, including, for example:

Obtaining control information and user attribute information of a target light strip, wherein the target light strip comprises a plurality of lamp beads;

Based on the control information and the user attribute information, determine a light effect parameter of a lamp bead included in the target light strip;

controlling the lamp beads included in the target light strip in accordance with the light effect parameters.

The methods disclosed in the above examples of the present application may be applied in, or implemented by, the processor 501. The processor 501 may be an integrated circuit chip with signal processing capabilities. In the implementation, the steps of the above method may be accomplished by integrated logic circuits of hardware in the processor 501 or by instructions in the form of software. The above-described processor 501 may be a general-purpose processor, a Digital Signal Processor (DSP), a Special Purpose Integrated Circuit (Application Specific Integrated Circuit (ASIC)), an off-the-shelf programmable gate array (Field Programmable Gate Array (FPGA) or other programmable logic devices, discrete gate or transistor logic devices, and discrete hardware components. Various methods, steps, and logic block diagrams of the disclosure in examples of the present application may be implemented or performed. The general purpose processor may be a microprocessor or the processor may also be any conventional processor, etc. The steps of the methods disclosed in conjunction with examples of the present application may be directly embodied as being performed by a hardware decoding processor or performed with a combination of hardware and software units in the decoding processor. The software unit may be located in a random memory, flash memory, read-only memory, programmable read-only memory or electrically erasable programmable memory, registers, and other storage media well established in the art. The storage medium is located in memory 502, and the processor 501 reads the information in memory 502 and completes the steps of the above method in combination with its hardware.

It will be appreciated that these examples described herein may be implemented in hardware, software, firmware, middleware, microcode, or combinations thereof. For hardware implementations, the processing unit may be implemented in one or more Application Specific Integrated Circuits (ASICs), Digital Signal Processing (DSPs), Digital Signal Processing Devices (DSPDevices, DSPDs), Programmable Logic Devices (PLDs), Programmable Logic Devices (PLDs), Programmable Logic Devices (PLDs), Programmable Logic Devices (PLDs), and Programmable Logic Devices (PLDs). DSPD), Programmable Logic Device (PLD), Field-Programmable Gate Array (FPGA), general-purpose processors, controllers, microcontrollers, microprocessors, other electronic units used to perform the above functions of the present application, or combinations thereof.

For software implementations, the techniques described herein may be implemented by units that perform the functions described herein. The software code may be stored in a memory and executed through a processor. The memory may be implemented in the processor or external to the processor.

The electronic device provided in this example may be an electronic device as shown in FIG. 5, which may perform all the steps of each of the above-described light strip control methods, and thereby realize the technical effect of each of the above-described light strip control methods, please refer to the above relevant descriptions, which are described herein for the sake of brevity.

Examples of the present application also provide a storage medium (computer readable storage medium). The storage medium herein stores one or more programs. Among other things, the storage medium may include volatile memory, such as random access memory; the memory may also include non-volatile memory, such as read-only memory, flash memory, a hard disc or a solid state drive; and the memory may also include a combination of the above types of memory.

When the one or more programs in the storage medium are executable by the one or more processors to implement the above-described method of controlling the light strip executed on the electronic device side.

The above processor is used to execute the light strip control program stored in the memory to implement the following steps of the light strip control method performed on the electronic device side:

obtaining control information and user attribute information of a target light strip, wherein the target light strip has a plurality of lamp beads;

determining, based on the control information and the user attribute information, one or more light effect parameters of one or more lamp beads included in the target light strip;

controlling the lamp beads included in the target light strip in accordance with the determined light effect parameters.

The professional should be further aware that the units and algorithmic steps of the various examples described in conjunction with the examples disclosed herein are capable of being implemented in electronic hardware, computer software, or a combination of both, and that the composition and steps of the various examples have been described in the foregoing description in general terms according to function, in order to clearly illustrate the interchangeability of hardware and software. Whether these functions are performed in hardware or software depends on the particular application and design constraints of the technical solution. The skilled person may use different methods to implement the described functions for each particular application, but such implementations should not be considered outside the scope of this application.

The steps of the method or algorithm described in conjunction with the examples disclosed herein may be implemented with hardware, a software module executed by a processor, or a combination of both. The software module may be placed in random memory (RAM), memory, read-only memory (ROM), electrically programmable ROM, electrically erasable programmable ROM, registers, hard drives, removable disks, CD-ROMs, or any other form of storage medium known in the art.

It should be understood that the terms used in the text are used for the sole purpose of describing particular example examples and are not intended to be limiting. The singular forms "one", "a", and "the", as used herein, may be expressed to include the plural form unless the context clearly indicates otherwise. The terms "including", "comprising", "containing", and "having" are inclusive and therefore specify that the presence of the stated features, steps, operations, elements and/or components does not preclude the presence or addition of one or more other features, steps, operations, elements, components, and/or combinations thereof. The method steps, processes, and operations described in the text are not to be construed as necessarily requiring that they be performed in the particular order described or illustrated unless the order of performance is clearly indicated. It should also be understood that additional or alternative steps may be used.

The foregoing are only specific examples of the present invention to enable those skilled in the art to understand or realize the invention. Various modifications to these examples will be apparent to those skilled in the art, and the general principles defined herein may be implemented in other examples without departing from the spirit or scope of the present invention. Accordingly, the present invention will not be limited to these examples shown herein, but will be subject to the broadest possible scope consistent with the principles and novel features claimed herein.

What is claimed is:

1. A method of controlling a light strip, comprising:

obtaining control information and user attribute information of a target light strip having a plurality of lamp beads;

determining lamp bead information for a lamp bead of the plurality of lamp beads in the target light strip, wherein the lamp bead information comprises a height of the lamp bead, and wherein the target light strip is divided into a plurality of segments based on the determined lamp bead information;

determining light effect parameters associated with each of the plurality of segments in the target light strip based on the control information and the user attribute information; and controlling the plurality of lamp beads in the target light strip in accordance with the determined light effect parameters.

2. The method according to claim 1, wherein the lamp bead information comprises at least one of:

the height of the lamp bead of the plurality of lamp beads, an angle of the lamp bead, and a distance of the lamp bead, wherein the angle of the lamp bead is the angle between an irradiation direction of the lamp bead and a ground direction, the distance of the lamp bead is the distance between the lamp bead and a target lamp bead, and wherein the target lamp bead is a neighboring lamp bead in a target direction of the lamp bead.

3. The method according to claim 2, wherein determining the height of the lamp bead comprises:

determining the angle between the irradiation direction of the lamp bead and the ground direction to obtain a target angle; and determining the distance between the lamp bead and the ground direction based on the target angle to obtain the height of the lamp bead, wherein the distance of the lamp bead is determined by:

determining the distance between the lamp bead and the target lamp bead based on the target angle.

4. The method according to claim 2, wherein a segment of the plurality of segments satisfies at least one of following conditions:

a first height difference of the segment is less than or equal to a first height threshold, and a first angle difference of the segment is less than or equal to a first angle threshold, wherein the first height difference is a height difference between a lamp bead in the segment and the target lamp bead of the lamp bead, and wherein the first angle difference is a difference between an angle of the lamp bead in the segment and an angle of the target lamp bead of the lamp bead;

the first height difference is greater than the first height threshold, a second height difference of the segment is less than a second height threshold, and the first angle difference is less than or equal to the first angle threshold, wherein the second height difference is a difference between a maximum height difference between any lamp beads in the segment and a minimum height difference between any lamp beads in the segment;

a boundary lamp bead in the segment satisfies a condition that a distance between the boundary lamp bead and a target lamp bead of the boundary lamp bead is greater than a first distance or less than a second distance, wherein the second distance is less than the first distance; or a number of boundary lamp beads in each sub-segment of the plurality of segments is less than or equal to 2.

5. The method according to claim 2, further comprising:

determining category information for each segment of at least two segments of the plurality of segments after dividing the target light strip to obtain the plurality of segments; and wherein determining the light effect parameters of the lamp beads in the plurality of the segments is further based on the determined category information.

6. The method according to claim 1, wherein determining the light effect parameters further comprises:

determining, using at least one of a pre-trained machine learning model and a pre-established light effect knowledge base, the light effect parameters corresponding to the control information and the user attribute information to obtain the light effect parameters of the lamp beads in the target light strip, wherein the pre-trained machine learning model is used to characterize the correspondence between the control information, the user attribute information and the light effect parameters, and wherein the pre-established light effect knowledge base is used to characterize the correspondence between the control information, the user attribute information and the light effect parameters of a target quantity set of the light effect parameters.

7. The method according to claim 6, wherein determining, using the at least one of the pre-trained machine learning model and the pre-established light effect knowledge base, the light effect parameters corresponding to the control information and the user attribute information comprises:

inputting the control information and the user attribute information into the pre-trained machine learning model to obtain output data from the machine learning model;

determining whether the output data represents the light effect parameters corresponding to the control information and the user attribute information to obtain discriminative information; and after determining that the discriminative information indicates that the output data is not the light effect parameters corresponding to the control information and the user attribute information, using the pre-established light effect knowledge base to determine the target quantity set of the light effect parameters corresponding to the control information and the user attribute information.

8. The method according to claim 1, wherein the control information is input via a user; and determining the light effect parameters comprises:

determining, based on the control information and the user attribute information, a plurality sets of the light effect parameters for a lamp bead in the target light strip; and determining, from the plurality sets of the light effect parameters, a target quantity set of the light effect parameters, wherein the target quantity set of the light effect parameters are sent to a control terminal of target the light strip, wherein controlling the plurality of lamp beads comprises:

selecting a light effect parameter from the target quantity set of the light effect parameters; and controlling the plurality of lamp beads in the target light strip in accordance with the selected light effect parameter.

9. The method according to claim 8, wherein determining the target quantity set of the light effect parameters comprises:

determining the target quantity set of the light effect parameters from the plurality set of the light effect parameters based on a return priority corresponding to each of the plurality sets of the light effect parameters; and after determining, from the plurality sets of the light effect parameters, the target quantity set of the light effect parameters, lowering the return priority corresponding to the light effect parameters in the target quantity set.

10. The method according to claim 1, wherein determining the light effect parameters is further based on a positional relationship of the plurality of lamp beads in the target light strip.

11. The method according to claim 1, wherein the control information comprises information input by a user for controlling the target light strip, and the user attribute information comprises data about the user's personal information or usage behavior.

12. The method according to claim 1, wherein controlling the plurality of lamp beads in the target light strip comprises:

controlling the light effect parameters of lamp beads in each of the plurality of segments based on the control information and the user attribute information.

13. A light strip control device comprises:

a processor and a memory coupled to the processor, the memory storing computer-readable instructions that, when executed by the processor, cause:

obtaining control information and user attribute information of a target light strip having a plurality of lamp beads;

determining lamp bead information for a lamp bead of the plurality of lamp beads in the target light strip, wherein the lamp bead information comprises a height of the lamp bead, and wherein the target light strip is divided into a plurality of segments based on the determined lamp bead information;

determining light effect parameters associated with each of the plurality of segments in the target light strip based on the control information and the user attribute information; and controlling the plurality of lamp beads in the target light strip in accordance with the determined light effect parameters.

14. The light strip control device according to claim 13, wherein the lamp bead information comprises at least one of:

the height of the lamp bead of the plurality of lamp beads, an angle of the lamp bead, and a distance of the lamp bead, wherein the angle of the lamp bead is the angle between an irradiation direction of the lamp bead and a ground direction, the distance of the lamp bead is the distance between the lamp bead and a target lamp bead, and wherein the target lamp bead is a neighboring lamp bead in a target direction of the lamp bead.

15. The light strip control device according to claim 14, wherein the instructions, when executed by the processor, further cause determining the height of the lamp bead by:

determining the angle between the irradiation direction of the lamp bead and the ground direction to obtain a target angle; and determining, based on the target angle, the distance between the lamp bead and the ground direction to obtain the height of the lamp bead, wherein the distance of the lamp bead is determined by:

determining the distance between the lamp bead and the target lamp bead based on the target angle.

16. The light strip control device according to claim 14, wherein a segment of the plurality of segments satisfies at least one of following conditions:

a first height difference of the segment is less than or equal to a first height threshold, and a first angle difference of the segment is less than or equal to a first angle threshold, wherein the first height difference is a height difference between a lamp bead in the segment and the target lamp bead of the lamp bead, and wherein the first angle difference is a difference between an angle of the lamp bead in the segment and an angle of the target lamp bead of the lamp bead;

the first height difference is greater than the first height threshold, a second height difference of the segment is less than a second height threshold, and the first angle difference is less than or equal to the first angle threshold, wherein the second height difference is a difference between a maximum height difference between any lamp beads in the segment and a minimum height difference between any lamp beads in the segment;

a boundary lamp bead in the segment satisfies a condition that a distance between the boundary lamp bead and a target lamp bead of the boundary lamp bead is greater than a first distance or less than a second distance, wherein the second distance is less than the first distance; or a number of boundary lamp beads in each sub-segment of the plurality of segments is less than or equal to 2.

17. The light strip control device according to claim 14, wherein the instructions, when executed by the processor, further cause:

determining category information for each segment of at least two segments of the plurality of segments after dividing the target light strip to obtain the plurality of segments; and determining the light effect parameters of lamp beads in the plurality of the segments further based on the determined category information.

18. The light strip control device according to claim 13, wherein the instructions, when executed by the processor, further cause determining the light effect parameters by:

determining, using at least one of a pre-trained machine learning model and a pre-established light effect knowledge base, the light effect parameters corresponding to the control information and the user attribute information to obtain the light effect parameters of the lamp beads in the target light strip, wherein the pre-trained machine learning model is used to characterize the correspondence between the control information, the user attribute information and the light effect parameters, and wherein the pre-established light effect knowledge base is used to characterize the correspondence between the control information, the user attribute information and the light effect parameters of a target quantity set of the light effect parameters.

19. The light strip control device according to claim 18, wherein the instructions, when executed by the processor, further cause determining, using the at least one of the pre-trained machine learning model and the pre-established light effect knowledge base, the light effect parameters by:

inputting the control information and the user attribute information into the pre-trained machine learning model to obtain output data from the machine learning model;

determining whether the output data represents the light effect parameters corresponding to the control information and the user attribute information to obtain discriminative information; and using the pre-established light effect knowledge base to determine the target quantity set of the light effect parameters corresponding to the control information and the user attribute information after determining that the discriminative information indicates that the output data is not the light effect parameters corresponding to the control information and the user attribute information.

20. A system comprising:

a light strip comprising a plurality of lamp beads; and a light strip control device coupled to the light strip to control the plurality of lamp beads in the light strip, wherein the light strip control device is configured to:

obtain control information and user attribute information of the light strip having the plurality of lamp beads;

determine lamp bead information for a lamp bead of the plurality of lamp beads in the light strip, wherein the lamp bead information comprises a height of the lamp bead, and wherein the light strip is divided into a plurality of segments based on the determined lamp bead information;

determine light effect parameters associated with each of the plurality of segments in the light strip based on the control information and the user attribute information; and control the plurality of lamp beads in the light strip in accordance with the determined light effect parameters.

* * * * *